United States Patent [19]
Kimberlin

[11] Patent Number: 4,926,970
[45] Date of Patent: May 22, 1990

[54] LUBE OIL SYSTEM FOR ROTATING MACHINERY

[75] Inventor: Robert R. Kimberlin, Athens, Pa.

[73] Assignee: Ingersoll-Rand Company, Woodcliff Lake, N.J.

[21] Appl. No.: 335,545

[22] Filed: Apr. 10, 1987

[51] Int. Cl.⁵ .............................................. F01M 1/00
[52] U.S. Cl. ....................................... 184/6.11; 184/6
[58] Field of Search .......................... 184/6.11, 6, 6.18

[56] References Cited

U.S. PATENT DOCUMENTS

| | | | |
|---|---|---|---|
| 2,077,580 | 4/1937 | Patterson | 184/6 |
| 2,741,276 | 4/1956 | Warren | 184/6 |
| 2,936,714 | 5/1960 | Balje | 184/6.11 |
| 3,767,013 | 10/1973 | Caldwell | 184/6.18 |
| 4,140,441 | 2/1979 | Patterson | 184/6.18 |

*Primary Examiner*—Carroll B. Dority
*Attorney, Agent, or Firm*—Walter C. Vliet; Robert F. Palermo

[57] ABSTRACT

A device is provided for the circulation of fluid through and about the rotary shaft of a rotating piece of equipment. The circulation is induced by a plurality of radially extending passageways from a center bore in the rotor shaft which extend to the external periphery of the shaft. Rotation causes the center of the shaft to be evacuated by pumping action created by the radial slots thereby producing a lowered pressure area producing a circulation path axially along the outside periphery of the shaft in one direction and axially along an internal through bore in the shaft towards the other end containing the radial slots. Bearings for mounting the shaft being disposed about the outer periphery of the shaft are thereby provided with lubrication and a cooling flow of fluids.

5 Claims, 1 Drawing Sheet

LUBE OIL SYSTEM FOR ROTATING MACHINERY

BACKGROUND OF THE INVENTION

A need has existed for the simple and reliable circulation of lubricating and cooling fluid to bearings of rotary machinery, such as pumps and compressors and turbines. In the past, devices such as separate oil pumps, and the like have been utilized to accomplish this with varying degrees of success and cost.

OBJECT OF THE INVENTION

The object of the present invention, therefore, is to produce a new and useful means for circulating lubrication and cooling fluids to shaft mounted bearings and components.

It is a further object of the present invention to accomplish this without additional moving parts which are subject to friction, wear and power loss.

These and other objects are obtained in a cooling system for a rotating machine of the type having a rotor mounted on a shaft and a stator surrounding the rotor, the rotor further being mounted for rotation with shaft means disposed for rotation within the stator on bearing means between the rotor and the stator the improvement comprising: the shaft means further including a central bore means and radial path means between the bore and the periphery of the shaft means for centrifugally inducing flow along the shaft means in an axial direction towards one end of the shaft about the periphery and towards the other end of the shaft through the bore towards the radial path means; the bearing means being disposed within the flow path produced.

DESCRIPTION OF THE PREFERRED EMBODIMENT

Figure 1:
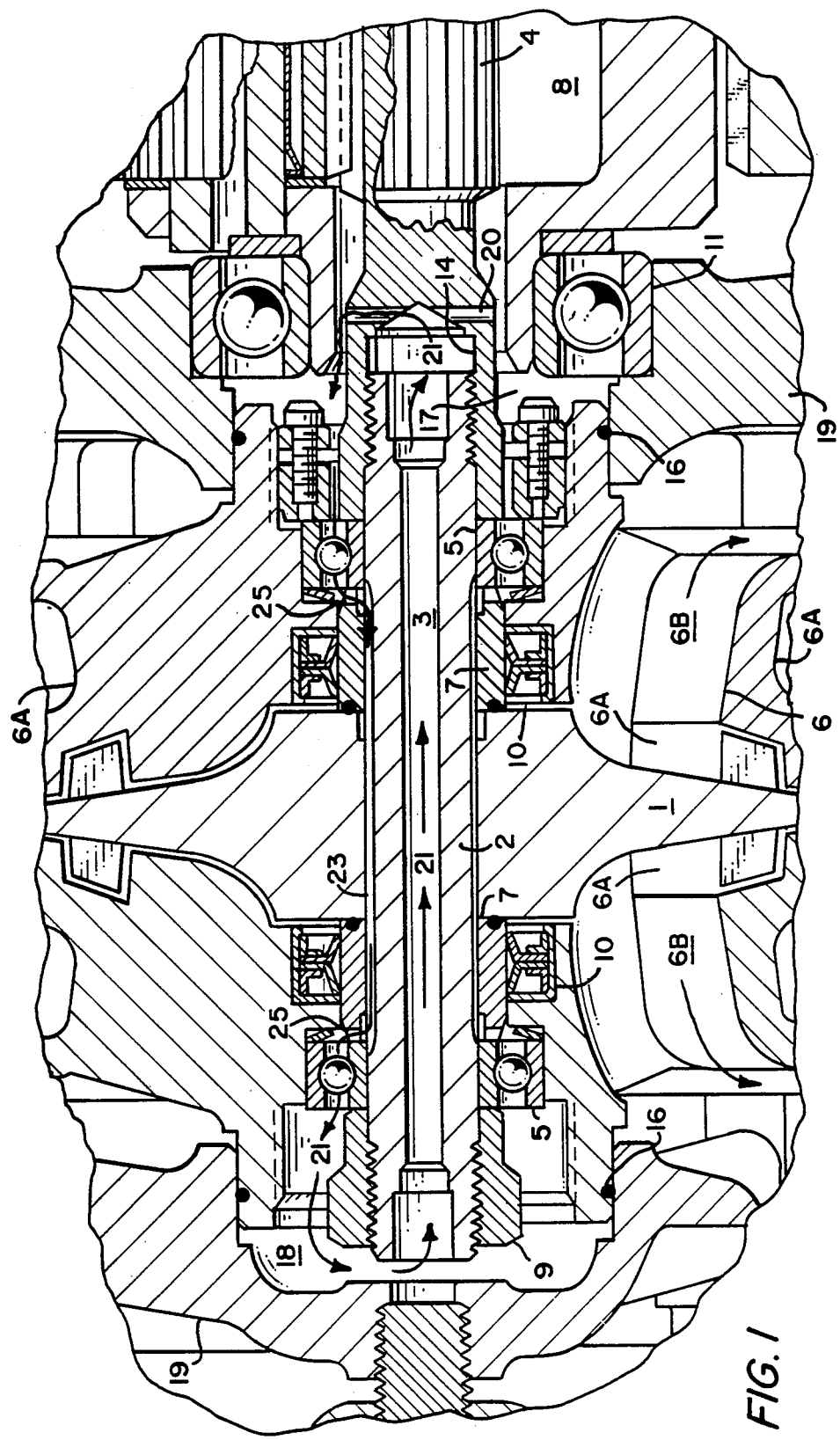
FIG. 1 is a partial cross section of a turbine using an oil lube system according to the present invention.

FIG. 1 shows a rotating machine according to the present invention selected as a preferred embodiment for purposes of describing the invention. It shows a radial inflow turbine rotor 1 mounted in a housing or stator 19 for rotation on a rotating shaft 2 having a central bore 3 therein. The shaft is journalled for rotation on bearings 5 on either end of the shaft.

At one end of the rotating shaft 2 is disposed a pinion gear 4 having a hollow pinion shaft bore 14 which threadingly engages the shaft 2. The other end of the rotating shaft 2 is retained within the bearing sets 5 by means of a locking nut 9. Surrounding the turbine wheel 1 are the required air plenums 6 for both inlet 6A and exhaust air 6B for pressure fluid used to operate the turbine and produce the required rotation of the turbine wheel. Rotation of the turbine wheel is in turn imparted to the shaft 2. Rotation and positioning of the shaft and turbine wheel within the plenum is facilitated by the bearing set 5. A bearing spacer 7 is provided on either side of the rotor to position the rotor relative to the bearings. The spacer 7 is further provided with a plurality of end slots 25 which permit circulation from the shaft grooves 23 to the bearings 5.

A pair of finger or lip type seals 10 control pressure fluid leakage from the air plenums and turbine wheel chamber along the shaft periphery. The plenums are further sealed relative to the motor housing 19 by means of, for example, O rings 16. It should now be understood that the environment of the shaft 2 and the pinion 4 and the nut 9 is essentially an air and entrained oil mixture picked up primarily from the gear reducer housing containing the planetary gear reducer generally designated by reference numeral 8. The oil and air mixture is admitted to the shaft cavity 17 through gear box bearing 11 and along the pinion 4 and thereafter along the shaft as described to sealed shaft cavity 18 where it is drawn into the center bore 3 of the shaft. It should also be understood that it is desirable to circulate the environment through the bearing sets 5 and beneath the rotor 1 to effect both cooling and lubrication of the bearings and seals.

According to the present invention radial bores 20 are provided in the pinion 4. The radial orientation of the bores on rotation creates a partial vacuum in the bore 3 of the shaft by centrifugally forcing the environmental air and entrained lubrication to the outside of the pinion. The resulting partial vacuum establishes a circulation flow shown by the flow arrows with reference numeral 21. The circulation therefore accomplishes the desired result of the invention in a simple, efficient and reliable manner by the provision of the radial bores 20 in combination with the hollow shaft 2 and the flow paths provided about the shaft through the bearings and through a pair of axial slots 23 provided beneath the turbine wheel. It should be understood that the radial bores may also be included in the end of the shaft and the end of the shaft sealed. By placing the radial slots or bores in the pinion both the functions of sealing the end of the shaft and the required pumping action are accomplished.

It should be understood that the preferred embodiment is described in terms necessary to understand the nature of the invention. Numerous modifications to the method of inducing flow by means of the radial disposed passageways will occur to one skilled in the art and applicant therefore does not wish to be limited in the scope of this invention except as claimed.

I claim:

1. A circulating system for cooling and lubrication for a rotating machine having a rotor mounted on shaft means and a stator surrounding the rotor, said shaft means disposed for rotation within the stator on bearing means in a bore of the stator and said shaft means further including a central bore, a pinion having a hollow pinion shaft fixed about an end portion of said shaft means and in communication with said central bore, and radial path means between the interior and the periphery of said pinion shaft for centrifugally inducing flow through said central bore in said shaft in an axial direction towards one end of said shaft and means forming a path for circulating fluid from said radial path means at one end of said shaft means through said bearing means and about the outer periphery of said shaft means to the central bore at the opposite end of said shaft means.

2. The circulating system for a rotating machine according to claim 1 wherein: said radial path means are radially disposed circular bores.

3. The pump means according to claim 1 wherein: said pinion shaft is in threading engagement on said rotating shaft means.

4. A circulating system for a rotating machine according to claim 1 wherein said means forming a path includes paths through the bearings on the outer surface of said shaft and within the inner surface of said rotor and through a bearing spacer on each side of said rotor.

5. A circulating system according to claim 4 wherein said paths on the outer surface of said shaft comprise a pair of axial grooves in said outer surface of said shaft and a plurality of end slots in said bearing spacers.

* * * * *